US009503923B2

(12) United States Patent
Bose et al.

(10) Patent No.: US 9,503,923 B2
(45) Date of Patent: Nov. 22, 2016

(54) COOPERATIVE MODULATION OF CLASSIFICATION IN COGNITIVE RADIO NETWORKS

(71) Applicant: The Arizona Board of Regents on Behalf of the University of Arizona, Tucson, AZ (US)

(72) Inventors: Tamal Bose, Tucson, AZ (US); Mahi Abdelbar, Blackburg, VA (US); William Tranter, Blacksburg, VA (US); Garrett Vanhoy, Tucson, AZ (US)

(73) Assignees: THE ARIZONA BOARD OF REGENTS ON BEHALF OF THE UNIVERSITY OF ARIZONA, Tucson, AZ (US); VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 70 days.

(21) Appl. No.: 14/644,147

(22) Filed: Mar. 10, 2015

(65) Prior Publication Data
US 2015/0256234 A1 Sep. 10, 2015

Related U.S. Application Data

(60) Provisional application No. 61/950,822, filed on Mar. 10, 2014.

(51) Int. Cl.
*H04W 24/08* (2009.01)
*H04W 16/14* (2009.01)
*H04W 24/00* (2009.01)

(52) U.S. Cl.
CPC ............. *H04W 24/08* (2013.01); *H04W 16/14* (2013.01); *H04W 24/00* (2013.01)

(58) Field of Classification Search
None
See application file for complete search history.

(56) References Cited

U.S. PATENT DOCUMENTS

| 8,223,890 | B1 * | 7/2012 | Su | H04L 27/38 375/324 |
| 8,369,460 | B1 * | 2/2013 | Su | H04L 25/067 375/262 |
| 8,385,473 | B2 * | 2/2013 | Liu | H04L 27/0012 375/316 |
| 8,917,802 | B1 * | 12/2014 | Su | H04L 27/0012 375/343 |
| 9,042,496 | B1 * | 5/2015 | Su | H04L 27/0012 375/346 |
| 2004/0204848 | A1 * | 10/2004 | Matsuo | G01C 21/32 701/431 |
| 2013/0230085 | A1 * | 9/2013 | Linn | H04L 27/3818 375/226 |

\* cited by examiner

*Primary Examiner* — Brian Roberts
(74) *Attorney, Agent, or Firm* — Blank Rome LLP

(57) ABSTRACT

Multiuser classification of the modulation schemes of simultaneous multiple unknown transmitters is disclosed. Cooperation among multiple cognitive radio receivers for modulation classification offers improvements in classification performance and overcomes detrimental channel effects that degrade single cognitive radio classifier performance. A centralized soft-combining data fusion algorithm based on the joint probability distribution of fourth order cumulants is presented for cooperative modulation classification. Fourth order cumulants of received signals are calculated as discriminating features for different modulation schemes at each cognitive radio node and sent to a centralized data node. The data node chooses the modulation scheme that maximizes the joint probability of the estimated cumulants.

19 Claims, 4 Drawing Sheets

COOPERATIVE MODULATION OF CLASSIFICATION IN COGNITIVE RADIO NETWORKS

CROSS-REFERENCE TO RELATED APPLICATIONS

The present application claims the priority benefit of U.S. provisional application No. 61/950,822 filed Mar. 10, 2014 and entitled "Cooperative Modulation Classification in Cognitive Radio Networks," the disclosure of which is incorporated herein by reference.

BACKGROUND OF THE INVENTION

1. Field of the Invention

The present invention generally relates to cognitive radio networks. More specifically, the present invention relates to implementing a multi-user modulation classification in a distributed cognitive radio network.

2. Description of the Related Art

Signal classification is an important component in cognitive radio networks. Cognitive radios are intelligent radio transceivers capable of sensing wireless signals in an operating frequency band and adapting their transmission parameters responsive to the sensed wireless signals. In order to make such responsive decisions, intelligent radio devices like cognitive radios need to understand which devices currently occupy particular radio frequency bands. Cognitive radios may further wish to find compatible devices with which to communicate, locate unoccupied frequencies, or avoid bands occupied by certain types of transmitting or receiving devices due to interference.

Automatic Modulation Classification (AMC) techniques have traditionally been used in cognitive radio networks to recognize the modulation scheme of unknown transmitted signals. Recognition of modulation schemes for an unknown signal is generally considered an intermediate step between signal detection and demodulation. AMC is used in a variety of cognitive radio networks, including civilian, commercial, and even military.

AMC algorithms (i.e., classification techniques) can be broadly classified in two categories: likelihood-based approaches and feature-based approaches. Likelihood-based approaches characterize the likelihood function of a received waveform conditioned on a particular constellation format. Feature-based approaches, on the other hand, rely on a set of features to perform a classification task.

Feature-based AMCs are more widely used because of their ease of implementation and manageable computational complexity. Higher order statistics, cyclostationary features, and wavelet features are a few of the more commonly used feature-based AMCs. But while a body of research exists with respect to the use of AMC algorithms in cognitive radio networks, the detection and classification of signals from more than one user within a certain frequency band has yet to receive widespread adoption much less particular attention.

For example, simulations have been performed using a distributed algorithm for cooperative modulation classification using an iterative Method of Multipliers (MoM) optimization algorithm. In such a simulation, individual nodes exchange data and each independently reach (presumably) the same decision. This iterative approach is ineffective, however, in that it imposes a high overhead on the wireless network.

Alternative simulations that utilized a more centralized approach have been studied. For example, simulations have occurred where a centralized data node collects decisions rendered by individual nodes. While this approach minimizes network overhead by not requiring each individual node to exchange data with one another, the centralized node merely combines the final decisions of the distributed cognitive radio nodes thereby ignoring a wealth of information contained in soft data.

As the radio frequency spectrum becomes more congested with traffic and interference, it becomes increasingly likely that multiple signals will simultaneously co-exist within the same band. And as cognitive radios become more commonplace, there will be a corresponding demand for modulation classification to allow for navigation around highly congested or otherwise interference laden networks. Increasing demands for spectrum management and policy application will likewise require additional network detail and information not available from presently utilized algorithms. There is thus a need in the art for detection and classification of multi-user signals within a frequency band.

SUMMARY OF THE PRESENTLY CLAIMED INVENTION

A system for cooperative modulation classification of multiple signals in cognitive radio networks is claimed.

A non-transitory computer readable storage medium having embodied thereon instructions executable by a processor to perform a method for modulation classification in a cognitive radio network is claimed. Upon execution of the instructions, a method is performed that includes performing maximum likelihood combining and joint probability distribution of fourth order cumulants at a centralized node receiving vector information from a plurality of cognitive radios in a network.

DETAILED DESCRIPTION

Embodiments of the presently disclosed invention include a system and method that allow for simultaneous multi-user modulation classification using distributed sensors and/or cognitive radios that collect sensing data and process that data using a distributed classification algorithm. Such an algorithm uses maximum likelihood combining and joint probability distribution of fourth order cumulants. This classification algorithm overcomes presently existing challenges with respect to single-receiver modulation classification such as low signal to noise ratio, signal fluctuations (fading), hidden nodes, and low classification accuracy. The presently disclosed classifier also allows for centralized multi-user modulation classification and low network overhead while simultaneously providing additional information to the classifier operating at a centralized data node.

Existing modulation classification algorithms do not adequately account for multiple receiver situations such as sensor networks. Such algorithms are, therefore, disadvantageous in that combined signals from a set of geographically dispersed sensors provide a better statistical description than any one, individual node. Fusing classification decisions or data from multiple receivers, sensors, or radios leads to a more effective modulation classification of weak signals without suffering from the limitations of single receiver configurations.

Figure 1:
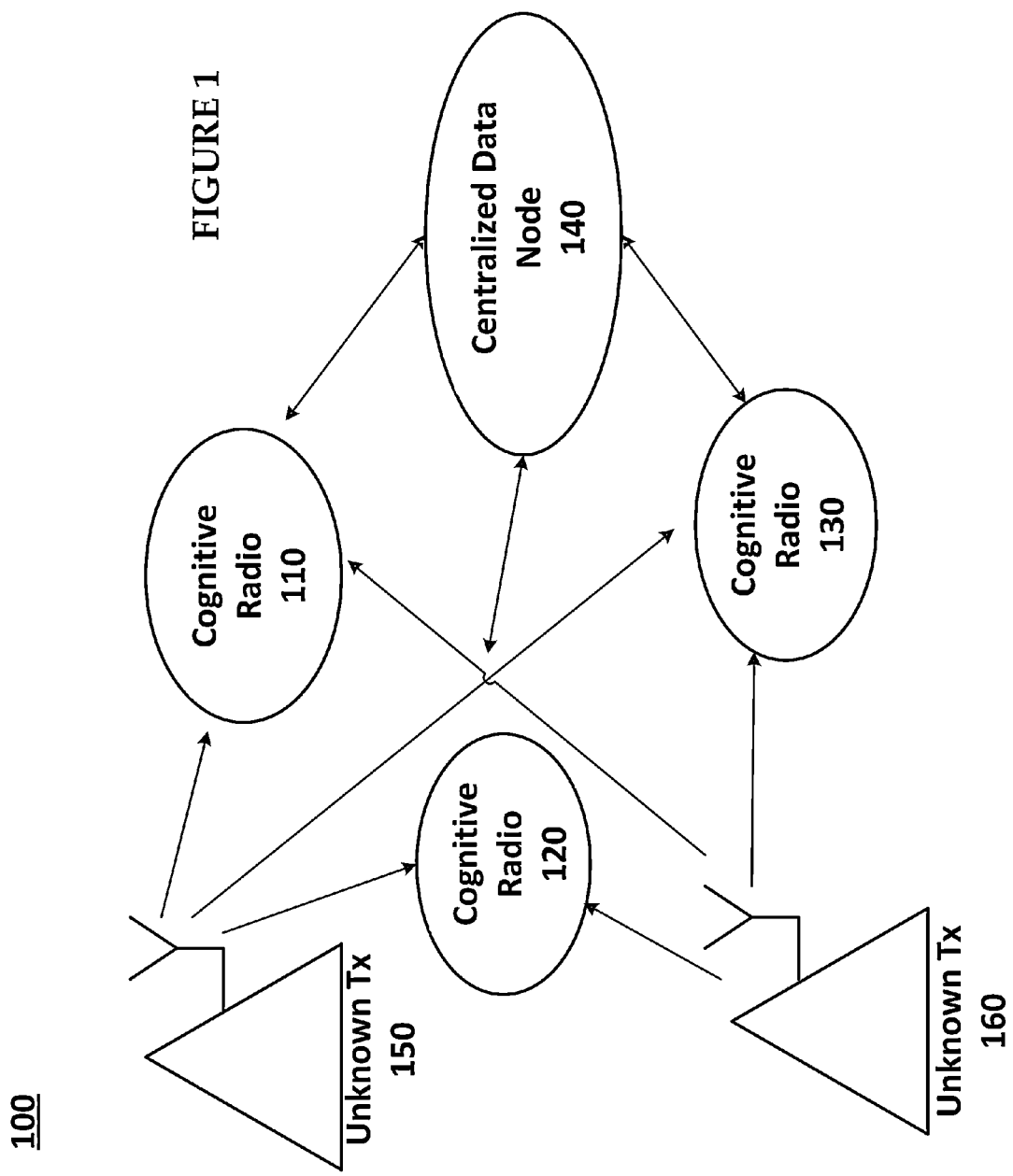
FIG. 1 illustrates a system for distributed modulation classification of multiple asynchronous transmitters in a cooperative cognitive radio environment.

FIG. 1 illustrates a system 100 for distributed modulation classification of multiple asynchronous transmitters in a cooperative cognitive radio environment. The system 100 of FIG. 1 utilizes the joint probability of higher order statistics of the unknown signals. The system 100 of FIG. 1 operates in two stages. The first stage involves calculation of statistical features of the unknown transmitted signals at distributed cognitive radio nodes or sensors. The second stage operates at the central data node using centralized maximum likelihood combining of the estimated features at a central data node.

System 100 includes a network of distributed cognitive radio nodes or sensors (110-130) that provide the statistical features of the aforementioned first stage. System 100 as illustrated in FIG. 1 also includes a centralized node 140 that receives said features and uses the aforementioned classification methodologies to arrive at a modulation classification. While FIG. 1 illustrates the system 100 having a dedicated and so-called centralized data node 140, there is no operational requirement that node 140 be dedicated or physical centralized. In some embodiments of system 100, the central data node 140 may be a distributed cognitive radio or sensor node like those illustrated as nodes 110-130. A particular node from amongst all cognitive radio nodes or sensors may be tasked as the 'central node.' Such a node may alternatively take on such a responsibility based on certain network conditions or operational or failure status of other nodes in the system 100.

Unknown transmitters 150 and 160 are any device operating in the network but for which node 140 is not otherwise completely aware of its network status or configuration. For example, unknown transmitters could be unauthenticated or anonymous user devices operating in or seeking to operate in the network like the mobile devices described in FIG. 4. Unknown transmitters could also be affirmative sources of interference as also described in the context of FIG. 4.

Figure 2:
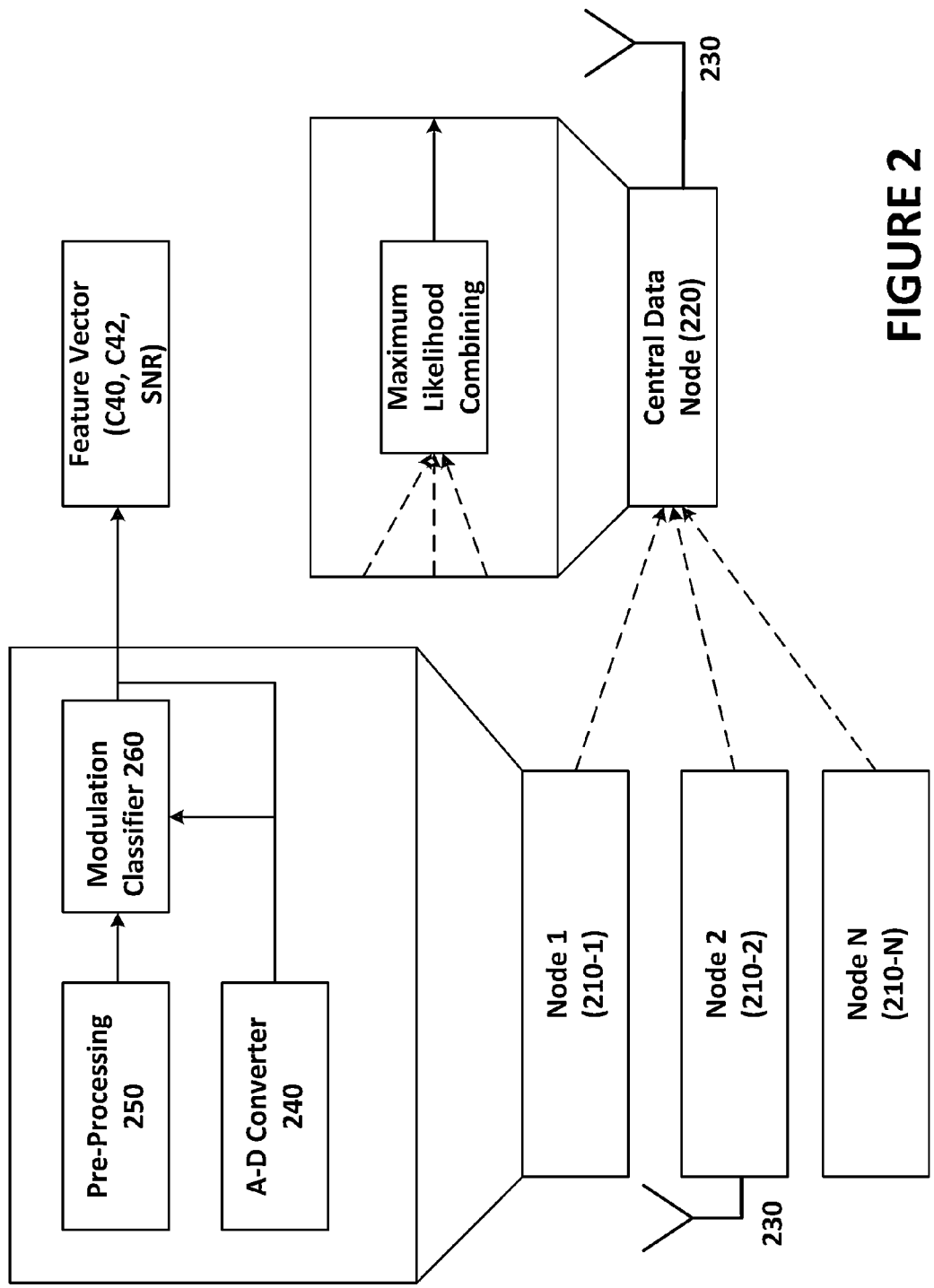
FIG. 2 illustrates the processing architecture of a cognitive radio node as well as a centralized data node.

FIG. 2 illustrates the processing architecture of a cognitive radio node 210 as well as a centralized data node 220. The cognitive radio nodes of FIG. 1 (110-130) are akin to node 210 of FIG. 2. Similarly, the centralized data node 140 of FIG. 1 corresponds to central data node 220. Each of cognitive radio nodes 210 and central data nodes 220 include a radio frequency front-end 230. For a cognitive radio device to have the ability to simultaneously classify multiple signals as might occur in MIMO channel mode, the RF front-end is coupled to multiple antennas. Nodes 210 and 220 likewise include an analog-to-digital converter 240, preprocessing module 250, and a modulation classifier 260 such as a baseband signal processor containing a memory element.

Figure 3:
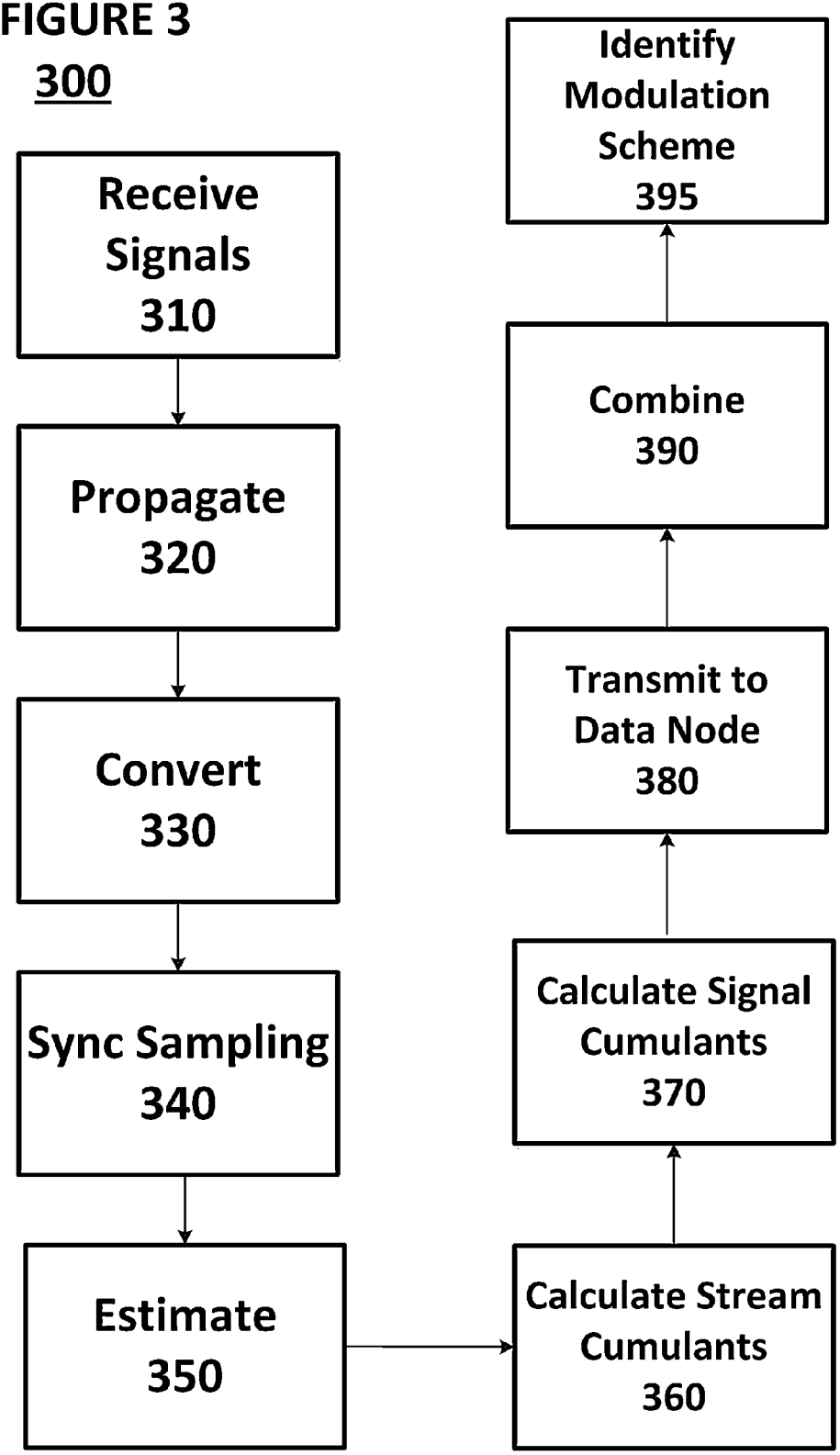
FIG. 3 is a method for cooperative modulation classification in a cognitive radio network.

FIG. 3 is a method 300 for cooperative modulation classification in a cognitive radio network. In step 310, the unknown signals from unknown transmitters (e.g., transmitters 150 and 160 of FIG. 1) are received through multiple antennas. The received signals are then propagated through the RF front end (230) in step 320 and then converted into a digital format at step 330 by A-D converter 240. The preprocessing module 250 performs sampling synchronization at step 340 and estimates the number of transmitting users and noise power at step 350. Blind Channel Estimation may be performed on the independent signal streams from each antenna.

The modulation classifier 260 will then calculate the fourth order cumulants of the independent signal stream at step 360. Then, using the estimated channel coefficients, the classifier will estimate the fourth order cumulants of each transmitted signal at step 370.

In a multi-user scenario, the received signal at an antenna of a cognitive radio node having multiple antennas is a superposition of signals from many users. The estimate of fourth order cumulants of the received signal at a receiving antenna can be calculated from the received sample averages. On the other hand, cumulants of the sum of statistically independent random processes are equal to the sum of the cumulants of the individual processes in what is sometimes referred to as the additive property of cumulants. The estimate of the fourth order cumulants of the received signals can be calculated by solving:

$$\begin{bmatrix} \hat{C}_{4k_{y1}} \\ \vdots \\ \hat{C}_{4k_{ym}} \end{bmatrix} = \begin{bmatrix} \frac{\gamma_{11}}{\Delta_1^2} & \cdots & \frac{\gamma_{1l}}{\Delta_1^2} \\ \vdots & \ddots & \vdots \\ \frac{\gamma_{m1}}{\Delta_m^2} & \cdots & \frac{\gamma_{ml}}{\Delta_m^2} \end{bmatrix} \begin{bmatrix} \hat{C}_{4k_{x1}} \\ \vdots \\ \hat{C}_{4k_{xl}} \end{bmatrix}$$

The extracted cumulant variables are then used for classification in that the values of the fourth order cumulants of the received signals are used as discriminating features for the classification of different modulation schemes. As noted above, fourth order cumulants are higher order statistical features that have distinct values for each modulation format.

Each cognitive radio node will then transmit a vector of estimated features—the estimated fourth order cumulants and signal-to-noise ratio—to the centralized data node at step 380. Transmission is to the central data node 220 is as opposed to each cognitive radio that would otherwise independently classify the modulation schemes as is currently practiced in the art. The data node 220 will, at step 390, combine the received feature vectors through a proposed maximum likelihood-combining algorithm using the joint probability distribution of the estimated fourth order cumulants of each transmitted signal. Assuming independence of the transmitted signals in the context of Bayes' Rule, which relates current probability to prior probability, the data node 220 will generate a decision as to the modulation scheme of each signal at 395. For each signal, the data center will choose the modulation scheme exhibiting the highest probability that the estimated features were drawn therefrom.

The exclusion of redundant data and weighting of the cognitive radio nodes estimated features in accordance with their contribution to classification is integrated into the combining algorithm. The result is a highly accurate classification result, especially when compared to independently performed classification at each cognitive radio node. Sharing the feature vector between only the distributed classifier nodes (210) and the central data node (220) results in minimizing the addition of overhead to the wireless network.

Use of the aforementioned cooperative modulation classification may occur in the context of other intelligent spectrum management systems. For example, the aforementioned cooperative classifier may be used in the context of spectrum management, trading, and analytics. Along with dynamic radio frequency mapping, the cooperative classifier can inform a spectrum exchange system of surrounding signal characteristics that can help further classify types of interference. By providing a more complete picture of spectrum activity, a network or spectrum administrator will be better able to efficiently manage a network or spectrum.

Correct classification of a modulation scheme likewise overcomes problems related to shadowing, fading, and hidden nodes. And in the event that multiple devices are simultaneously transmitting such that a cognitive radio needs to classify more than one signal at a time, the present classification scheme avoids issues related to performance degradation. Combining the classification results of physically distributed cognitive radio nodes enhances the performance of modulation classifiers, exploits the spatial diversity of scattered classifiers, and otherwise obviates detrimental channel effects.

Figure 4:
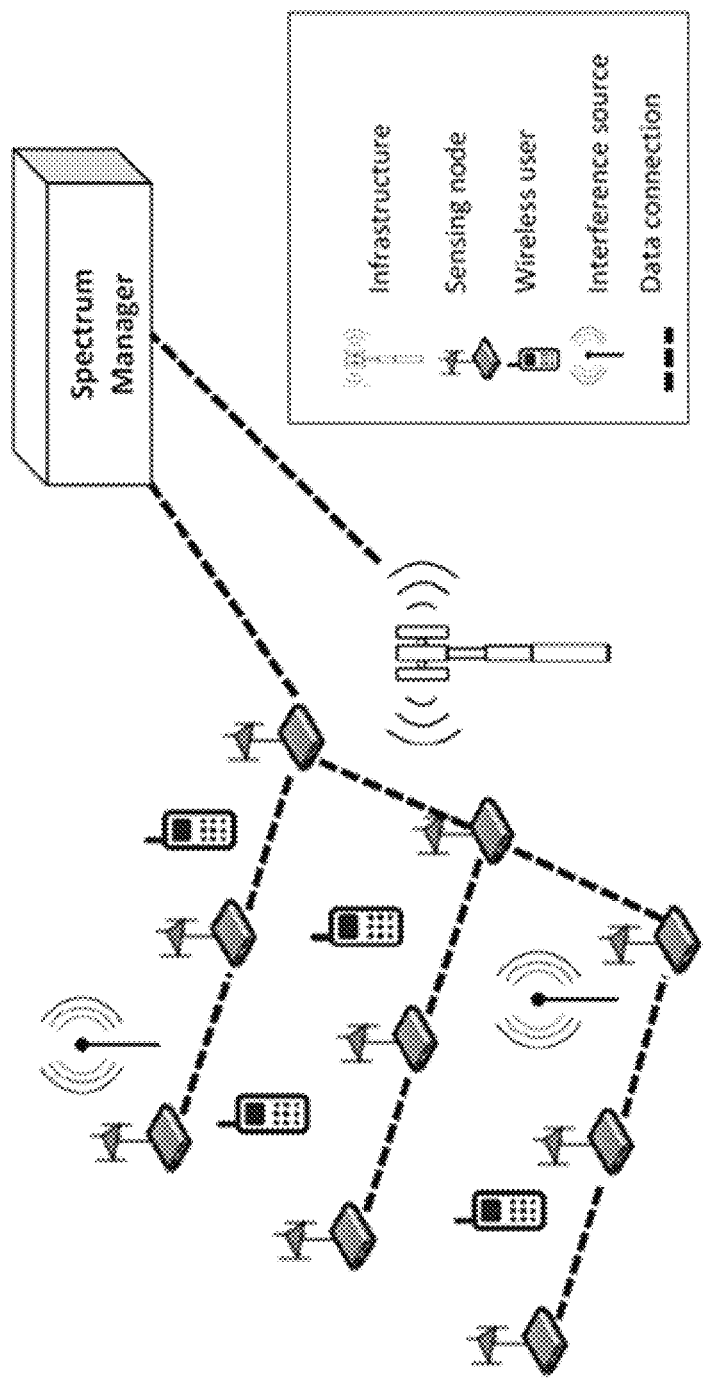
FIG. 4 illustrates an exemplary sensor network in which cooperative modulation might be implemented to efficiently manage a network or spectrum.

FIG. 4 illustrates an exemplary sensor network 400 in which cooperative modulation might be implemented to efficiently manage a network or spectrum. The sensor network 400 of FIG. 4 illustrates nine sensing nodes ($410_A$, $410_B$ ... $410_I$). The nodes 410 in FIG. 4 may be low-end spectrum sensing nodes or higher-end software-defined-radio (SDR) platforms. The sensor network 400 may be a homogeneous or heterogeneous combination of sensing nodes 410 (i.e., all low-end nodes, all SDRS, or a combination of the two).

FIG. 4 further illustrates radio network infrastructure 420. Radio network infrastructure 420 is inclusive of the universe of equipment necessary to access the RF spectrum. An example of such infrastructure includes base station equipment. Base station equipment is further inclusive of receivers, transmitters, and/or transceivers, encoders and decoders, and a power supply. Antenna and tower equipment may also be a part of a base station implementation. Network infrastructure 420 may further include a network of repeaters or other transmission/retransmission towers as well as any variety of wireless access devices that might be present in a particular network or cell of a network.

FIG. 4 further illustrates a series of wireless users 430, interference sources 440, and data connections 450. Wireless users 430 are representative of any wireless device having a radio and that may access a wireless network, including by way of network infrastructure 420. Examples of wireless devices include traditional two-way radios, smartphones, tablets, or other mobile devices with cellular or wireless radios, wireless laptops, and wireless network devices such as wireless routers.

Interference sources 440 are generally viewed as any external source that causes or contributes to electromagnetic interference. Such interference disturbs or otherwise affects an electrical circuit (e.g., a radio) thereby degrading or limiting the effective performance of that circuit. Effects can span a range that includes a degradation of data, a total loss of data, as well as a total lack of network access. Common interference sources 440 include GPS units, garage door openers, Bluetooth devices, and cordless phones. In some instances, too many wireless users 430 in a particular geographic area that are attempting to access a particular wireless frequency or channel can themselves constitute an interference source 440.

Data connections 450 are the wireless and/or wired connections that communicatively couple wireless users 430 with network infrastructure 420, various components of network infrastructure 420 with other infrastructure componentry, and sensing nodes to a cognitive radio data center 460. Cognitive radio data center 460 includes the aforementioned hardware, logic, and network connectivity to allow for communication with other components of network 400, including but not limited to sensing nodes 410.

Data center 460 performs the maximum-likelihood-combining and joint probability distribution of fourth order cumulants to overcome the challenges of single receiver modulation classification such as low SNR, signal fluctuation, hidden nodes, and low classification accuracy. The collection, processing, and mapping of spectrum sensing data from sets of networked spectrum sensors provides for a robust characterization of a wireless service area. Such a characterization provides greater potential to make better use of scarce spectrum resources.

One skilled in the art will appreciate the reference to various APIs, engines, instructions, or other executable components as described above. One skilled in the art will likewise appreciate that these various functionalities or methodologies may be implemented in the context of computer-readable instructions. Those instructions may be stored in a non-transitory computer readable storage medium such as memory. Those instructions may be executed by a processor or series of processing devices which may be local or distributed; the same may be said of the storage of said instructions. Various other computer and networking components will be known to one of skill in the art for the purpose of receiving and transmitting those instructions, storing said instructions, and otherwise effectuating the same.

The foregoing detailed description has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A system for cooperative modulation classification of multiple signals in cognitive radio networks, the system comprising:
   a plurality of cognitive radios, wherein each cognitive radio includes:
      an antenna that receives one or more unknown signals, and
      a modulation classifier executable to calculate fourth order cumulants of the received signals; and
   a centralized node that:
      receives a plurality of fourth order cumulants from the plurality of cognitive radios, and
      combines the received plurality of fourth order cumulants through a maximum likelihood-combining algorithm using the joint probability distribution of estimated fourth order cumulants of each transmitted signal.

2. The system of claim 1, wherein at least one of the cognitive radios includes an RF front end that propagates the received signals.

3. The system of claim 1, wherein at least one of the cognitive radios includes an analog-to-digital converter that converts the received signals into a digital format.

4. The system of claim 1, wherein at least one of the cognitive radios includes a preprocessing module executable to perform sampling synchronization on the received signals.

5. The system of claim 1, wherein the modulation classifier is further executable to estimate the fourth order cumulants of each received signal.

6. The system of claim 1, wherein the centralized node determines a modulation scheme of each received signal based on the maximum likelihood combining and joint probability distribution of fourth order cumulants.

7. The system of claim 6, wherein each of the cognitive radios is weighted in accordance with a respective contribution to the determination of modulation scheme.

8. The system of claim 1, wherein the centralized node is a cognitive radio tasked with centralized node responsibilities based on one or more network conditions, and wherein one of the cognitive radios takes on the centralized node responsibilities when the one or more network conditions change.

9. A method for cooperative modulation classification of multiple signals in cognitive radio networks, the method comprising:
    receiving a plurality of fourth order cumulants of received unknown signals, the received fourth order cumulants from a plurality of cognitive radios; and
    executing instructions stored in non-transitory computer-readable storage media, wherein execution of the instructions by a processor combines the received plurality of fourth order cumulants through a maximum likelihood-combining algorithm using the joint probability distribution of estimated fourth order cumulants of each transmitted signal.

10. The method of claim 9, further comprising converting the received signals into a digital format by an analog-to-digital converter by at least one of the cognitive radios from the plurality of cognitive radios.

11. The method of claim 9, further comprising performing sampling synchronization on the received signals via execution of a preprocessing module by at least one of the cognitive radios from the plurality of cognitive radios.

12. The method of claim 9, further comprising estimating the fourth order cumulants for each received signal via execution of a modulation classifier.

13. The method of claim 9, further comprising determining a modulation scheme of each received signal based on the maximum likelihood combining and joint probability distribution of fourth order cumulants.

14. The method of claim 9, further comprising weighting each of the cognitive radios from the plurality of cognitive radios in accordance with a respective contribution to the determination of modulation scheme.

15. The method of claim 9, further comprising identifying one or more network conditions.

16. The method of claim 15, further comprising taking on centralized node responsibilities based on the one or more network conditions.

17. The method of claim 16, further comprising reassigning centralized node responsibilities when the one or more network conditions change.

18. A non-transitory computer readable storage medium having embodied thereon instructions executable by a processor to perform a method for cooperative modulation classification of multiple signals in cognitive radio networks, the method comprising:
    identifying one or more network conditions;
    taking on centralized node responsibilities based on the one or more network conditions;
    receiving a plurality of fourth order cumulants of received unknown signals as a centralized node in network including a plurality of cognitive radios, the received fourth order cumulants received from the plurality of cognitive radios in the network;
    weighting each of the cognitive radios from the plurality of cognitive radios as the centralized node in accordance with a respective contribution to the determination of modulation scheme; and
    combining the received plurality of fourth order cumulants through a maximum likelihood-combining algorithm using the joint probability distribution of estimated fourth order cumulants of each transmitted signal in light of the weight of the cognitive radio from which the transmitted signal is received.

19. The non-transitory computer readable storage medium of claim 18, the method further comprising reassigning centralized node responsibilities when the one or more identified network conditions change.

* * * * *